US009646172B1

(12) United States Patent
Hahn et al.

(10) Patent No.: US 9,646,172 B1
(45) Date of Patent: May 9, 2017

(54) DATA STORAGE SYSTEM FOR SECURELY STORING DATA RECORDS

(71) Applicant: Envieta Systems LLC, Columbia, MD (US)

(72) Inventors: Jeffrey Hahn, Gaithersburg, MD (US); John Petro, Columbia, MD (US)

(73) Assignee: Envieta Systems LLC, Columbia, MD (US)

( * ) Notice: Subject to any disclaimer, the term of this patent is extended or adjusted under 35 U.S.C. 154(b) by 0 days.

(21) Appl. No.: 15/352,069

(22) Filed: Nov. 15, 2016

(51) Int. Cl.
| H04L 29/06 | (2006.01) |
| G06F 21/62 | (2013.01) |
| H04L 9/08 | (2006.01) |
| G06F 21/60 | (2013.01) |

(52) U.S. Cl.
CPC ........ G06F 21/6227 (2013.01); G06F 21/602 (2013.01); H04L 9/0869 (2013.01); H04L 9/0891 (2013.01); G06F 2221/2107 (2013.01)

(58) Field of Classification Search
CPC ............ G06F 21/6227; G06F 21/602; G06F 2221/2107; H04L 9/0869; H04L 9/0891
USPC ........................................................ 713/165
See application file for complete search history.

(56) References Cited

U.S. PATENT DOCUMENTS

| 7,155,745 B1* | 12/2006 | Shin ..................... G06F 9/547 709/229 |
| 8,331,560 B2* | 12/2012 | Boyen ................... G06F 21/602 380/285 |
| 8,464,053 B2* | 6/2013 | Davis ...................... H04L 9/32 713/150 |
| 2003/0070092 A1* | 4/2003 | Hawkes ................. H04L 63/04 726/4 |
| 2003/0112972 A1* | 6/2003 | Hattick ................. H04L 9/0656 380/46 |
| 2006/0020478 A1* | 1/2006 | Chang ................... G06Q 10/00 709/203 |
| 2007/0101157 A1* | 5/2007 | Faria ................. G11B 20/00086 713/193 |
| 2010/0031036 A1* | 2/2010 | Chauncey ........... H04L 63/0428 713/168 |
| 2011/0119487 A1* | 5/2011 | Alexander ............ H04L 9/0891 713/160 |
| 2011/0296440 A1* | 12/2011 | Laurich ................. G06F 21/602 719/326 |

(Continued)

*Primary Examiner* — Monjour Rahim
(74) *Attorney, Agent, or Firm* — Sterne, Kessler, Goldstein & Fox P.L.L.C.

(57) ABSTRACT

Systems and methods are disclosed for securely storing and accessing data records. In an embodiment, a random seed value and a time period counter received from a warrant server. The seed value may correspond to a starting time period and be updated by applying a one-way function to the seed value upon expiration of the starting time period and each subsequent time period. A data record may then be received including one or more data fields. A data field may be identified to use as an index value, and an encryption key may be generated based on the current random seed value and the index value. The data record and/or the index value may then be encrypted using the encryption key, and the encryption key may be securely deleted after encrypting the data record and/or the index value. The warrant server may then assist with recovery of the data.

30 Claims, 11 Drawing Sheets

(56) References Cited

U.S. PATENT DOCUMENTS

| | | | |
|---|---|---|---|
| 2013/0145177 A1* | 6/2013 | Cordella | G06F 12/1408 |
| | | | 713/193 |
| 2014/0133656 A1* | 5/2014 | Wurster | H04L 9/0637 |
| | | | 380/270 |
| 2015/0178724 A1* | 6/2015 | Ngo | H04L 9/0869 |
| | | | 705/71 |
| 2016/0055322 A1* | 2/2016 | Thomas | G06F 21/10 |
| | | | 726/7 |
| 2016/0057619 A1* | 2/2016 | Lopez | H04W 12/04 |
| | | | 380/247 |
| 2016/0366180 A1* | 12/2016 | Smith | H04L 9/088 |

\* cited by examiner

DATA STORAGE SYSTEM FOR SECURELY STORING DATA RECORDS

BACKGROUND

Field

Embodiments described herein are generally related to storing and accessing secured data.

Background

Significant security breaches involving unauthorized access to private data have occurred in recent years. These security breaches exposed personal information of millions of users and diminished public trust in organizations managing and storing the exposed data. To address these issues, various data storage and encryption technologies are commonly used to protect private data from remote or external threats, with varying degrees of success.

However, even if the private data is successfully guarded from external threats, the data may still be susceptible to parties inside an organization managing or storing the data. Accordingly, in a growing number of architectures, parties managing secured data storage systems may not, by policy or by law, be authorized to access the data without some form of authorization from an external party. Further complicating this architecture, many data storage systems need to grant ad-hoc access to subsets of stored private data, necessitating more complex data storage and encryption schemes.

SUMMARY

Systems and methods are disclosed for securely storing and accessing data records. In an embodiment, an initial random seed value and a time period counter are received from a warrant server. The random seed value and the time period counter may correspond to a starting time period, and the seed value may be updated by applying a one-way function to the seed value and overwriting the initial value upon expiration of the starting time period. The time period counter may be initialized to a starting value, such as 0. At the expiration of each subsequent time period, the current seed value may be updated by applying the one-way function to the current value, and the time period counter may be incremented, for example by 1. A data record may then be received including one or more data fields. A data field of the received data record may be identified to use as an index value, and an encryption key may be generated based on the current random seed value and the index value. The data record may be encrypted using the generated encryption key. In an embodiment, the index value is also encrypted using the encryption key.

In an embodiment, the generated encryption key is securely deleted or removed after encrypting the data record and/or the index value. The index value, encrypted data record, and time period counter may be stored as an associated triple at a data storage server. In an embodiment, the warrant server, data collection server, and the data storage server are implemented on separate devices or servers. In an embodiment, the warrant server may be taken off-line once the random seed value and the time period counter have been received, or the warrant server may be permanently off-line and communication between the warrant server and other components accomplished via hand-carried physical storage media.

In an embodiment, a request is received for data stored at the data storage server. The request may include a data identifier and a requested time period. A time period counter value may then be determined based on the requested time period. A warrant may be received based on the received request, which may include a decryption key derived based on the determined time period counter value, the initial random seed value, and the data identifier. The stored records at the data storage server may be searched to identify data records that match the warrant decryption key, and the identified data records may be decrypted using the decryption key. The decrypted data may then be provided to the requester. In some embodiments, the data stored at the data storage server may be searched by attempting to decrypt each stored data record using the warrant decryption key, or by attempting to decrypt each stored index value using the warrant decryption key. In the latter case, for each stored index value successfully decrypted, the stored data records associated with the decrypted index value may then be identified.

In an embodiment, upon receiving a request for data stored at the data storage server, a new random seed value for each elapsed time period since the starting time period may be derived by the warrant server by applying the one-way function to the random seed value. An additional decryption key may then be generated for each elapsed time period based on the private portion of the cryptographic key, the new seed value, and the data identifier of the received request. Each additional generated decryption key may be transmitted and received with the warrant.

In an embodiment, the data request may also include a requested time period. This requested time period in conjunction with the time interval between seed updates may be used to derive time period counter values during the time period. A new random seed value for the requested time period may be generated by iteratively applying the one-way function to the random seed value, and the warrant decryption key may be generated based on the new seed value and the data identifier of the received request.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art(s) to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Example System

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to include such feature, structure, or characteristic in connection with other embodiments whether or not explicitly described.

As the rate of electronic data collection, access, and transfer increases, the risk of unauthorized data access intensifies. Modern data storage systems need to protect against both external and internal threats to private data. A growing number of architectures attempt to restrict both external and internal data access by requiring some form of authorization from an external party, but current systems are inefficient and often still leave the data vulnerable to skilled attackers. Complicating the issue, many data storage systems need to grant ad-hoc access to subsets of securely stored data. For example, an individual may desire to store private data in a public cloud, but the individual may want to restrict which organizations have access to their data, including the organization managing and storing the data, and which records each organization can search and access.

Figure 1:
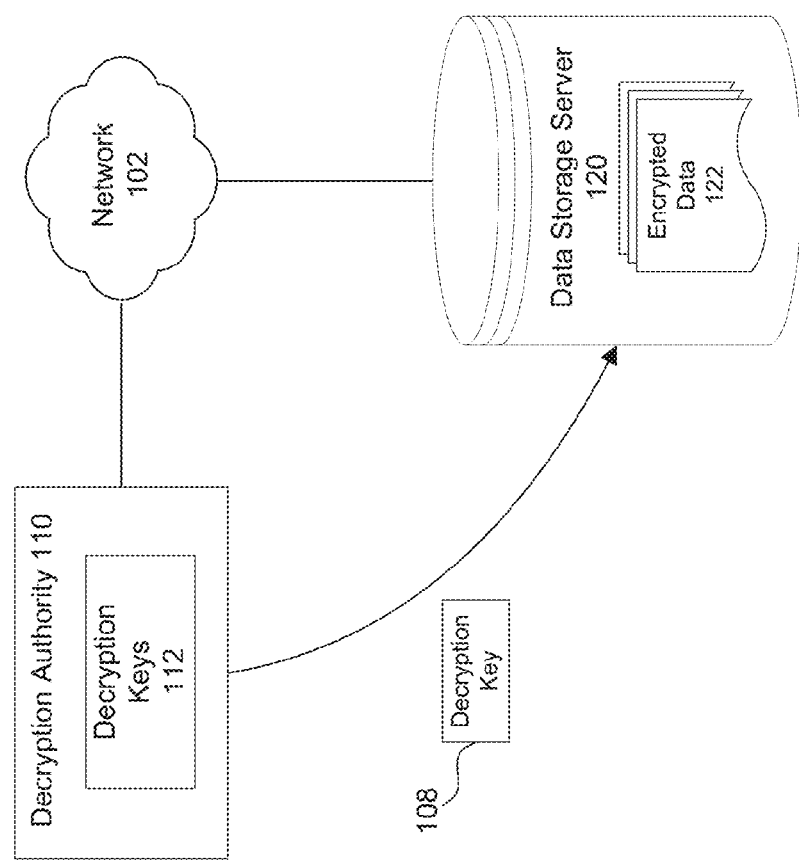
FIG. 1 is a diagram illustrating an example configuration for storing and accessing data in a networked environment, according to an embodiment.

A first step toward solving the issues associated with unauthorized data access is to separate data decryption authorization from the system actually storing encrypted private data, rather than storing the decryption keys with the encrypted private data. FIG. 1 illustrates an example configuration 100 of this type of architecture for storing and accessing data in a networked environment, according to an embodiment. Configuration 100 includes decryption authority 110 connected to data storage server 120 via a network 102. Network 102 may be any type of computer network capable of communicating data, for example, a local area network or a wide-area network (e.g., the Internet), or any combination thereof. In an embodiment, data storage server 120 stores encrypted data 122. Encrypted data 122 may be encrypted by data storage server 120 when received or by another entity coupled to data storage server 120. Encrypted data 122 may represent any type of data to which restricted access is desired, such as private data of an individual or organization.

Decryption authority 110 may store decryption keys 112 (used to decrypt encrypted data 122) separate from data storage server 120. Decryption authority may then vend decryption keys 112 (e.g., decryption key 108, as illustrated in FIG. 1) to data storage server 120 when access to encrypted data 122 is needed. This configuration prevents an attacker with access to data storage server 120 from accessing encrypted data 122 without also gaining access to the separate decryption authority 110.

However, the example techniques illustrated in configuration 100, may still be susceptible to unauthorized data access. First, configuration 100 requires that the devices performing encryption and decryption of data be tightly coupled for on-going transfer of encryption/decryption keys from decryption authority 110 to data storage server 120. This continuous communication requirement leaves the system vulnerable to internal attackers with knowledge of this link. Second, configuration 100 provides no ability to search the data stored at data storage server 120 without decrypting every data item, temporarily exposing additional data beyond what is specifically authorized for access.

Figure 2:
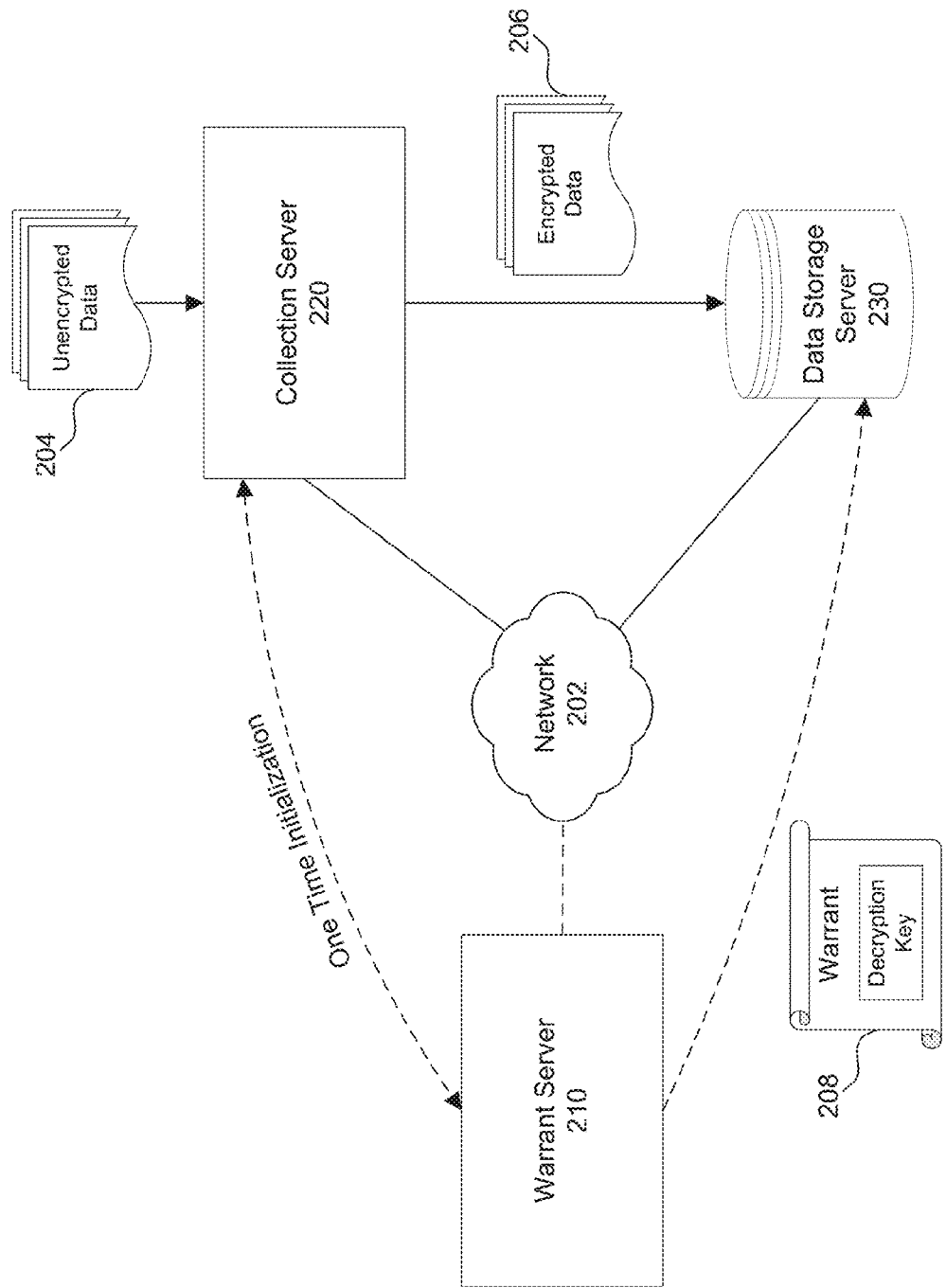
FIG. 2 is an example data storage system for securely storing and accessing data records, according to an embodiment.

FIG. 2 is an example data storage system 200 for securely storing and accessing data records, according to an embodiment. Data storage system 200 addresses the issues of unauthorized access to private data previously discussed. Data storage system 200 includes three separate entities with distinct roles: (1) warrant server 210, having the authority to grant access to encrypted records; (2) data collection server 220, where data requiring secure storage originates and is encrypted; and (3) data storage server 230, where the encrypted data resides until needed. Data storage server 230 may be coupled to a collection server 220 via network 202. Network 202 may be any type of computer network capable of communicating data, for example, a local area network or a wide-area network (e.g., the Internet), or any combination thereof. In an embodiment, data storage server 230 and collection server 220 are also coupled to warrant server 210. Warrant server 210 may be coupled to collection server 220 and data storage server 230 via network 202, by a physical data connection, or via a "sneaker net" using removable physical media allowing warrant server 210 to be electronically isolated. In an embodiment, warrant server 210, collection server 220, and data storage server 230 are implemented on separate computing systems, such as those described below with respect to FIG. 10. In other embodiments, collection server 220 and data storage server 230 may be collocated or implemented on the same computing system.

In an embodiment, collection server 220 receives and encrypts raw, unencrypted data 204. Unencrypted data 204 may include a plurality of data records that each contains one or more data fields. By way of example, each data field is illustrated as a plaintext data field throughout the specification, but in an embodiment, data fields may contain any unencrypted binary data. For example, unencrypted data 204 may include a number of data records storing client contact information, with each data record including a social security number (SSN) data field, a first name data field, a last name data field, a phone number data field, an address data field, or any other relevant data field. Collection server 220 may encrypt unencrypted data 204 to produce encrypted data 206, which may be sent to data storage server 230 for storage. Data storage server 230 may include any type of structured or unstructured data store for storing encrypted data 206, including a relational database, a document- or object-oriented database, or a flat file database. In an embodiment, unencrypted data 204 is encrypted individually for each data record to facilitate restricted access to subsets of unencrypted data 204, as will be discussed further below.

In an embodiment, warrant server 210 receives requests to access all or a portion of encrypted data 206 stored in data storage server 230. Warrant server 210 may determine whether a requester is authorized to access the desired data, and if so, generate a warrant 208. Warrant 208 in effect enables the requester to access authorized data by including a decryption key, which is sent by warrant server 210 to data storage server 230. Data storage server 230 may then use the decryption key in warrant 208 to decrypt data authorized by the warrant and provide the decrypted data to the requester.

According to an embodiment, warrant server 210 and collection server 220 require a one-time initialization, after which warrant server 210 and collection server 220 need not be in communication. As part of this initialization, warrant server 210 may first generate a random seed value corresponding to a starting time period. This seed value acts as a master key and may be stored in secure storage within warrant server 210 or in a separate device coupled only to warrant server 210 when needed to recover encrypted data.

In an embodiment, the starting time period may be configured to be any interval of time, such as a minute, an hour, a day, or a month. Following transmission of the random seed value, warrant server 210 and collection server 220 need not be in communication, and warrant server 210 may be isolated from collection server 220. In an embodiment, warrant server 210 is taken off-line and air-gapped from both collection server 220 and data storage server 230 following the one time initialization between warrant server 210 and collection server 220. In a further embodiment, warrant server 210 is permanently off-line and data transfers between warrant server 210 and other components, such as collection server 220 and data storage server 230, during initialization and for subsequent data recovery are handled via a "sneaker-net," as mentioned above.

While warrant server 210 may store the random seed value corresponding to the starting time period, in an embodiment, collection server 220 updates the random seed value upon expiration of the starting time period and each subsequent time period. Following each update, the current seed value is overwritten and the previous seed value is not stored at collection server 220. In an embodiment, collection server 220 updates the current seed value by applying a one-way function to the seed value. In an embodiment, well-known cryptographic hash functions may be used for this purpose, for example, but not limited to MD6, RIP-EMD-320, SHA-256, SHA-512, SHA-3, Whirlpool, BLAKE, or BLAKE2. The use of a one-way function and overwriting previous seed values provides forward secrecy because previous seed values at collection server 220 cannot be found or recreated. The collection server may also maintain a running time period counter that is incremented with each seed value update. The time period counter may be initialized to a starting value, for example to 0.

Figure 3:
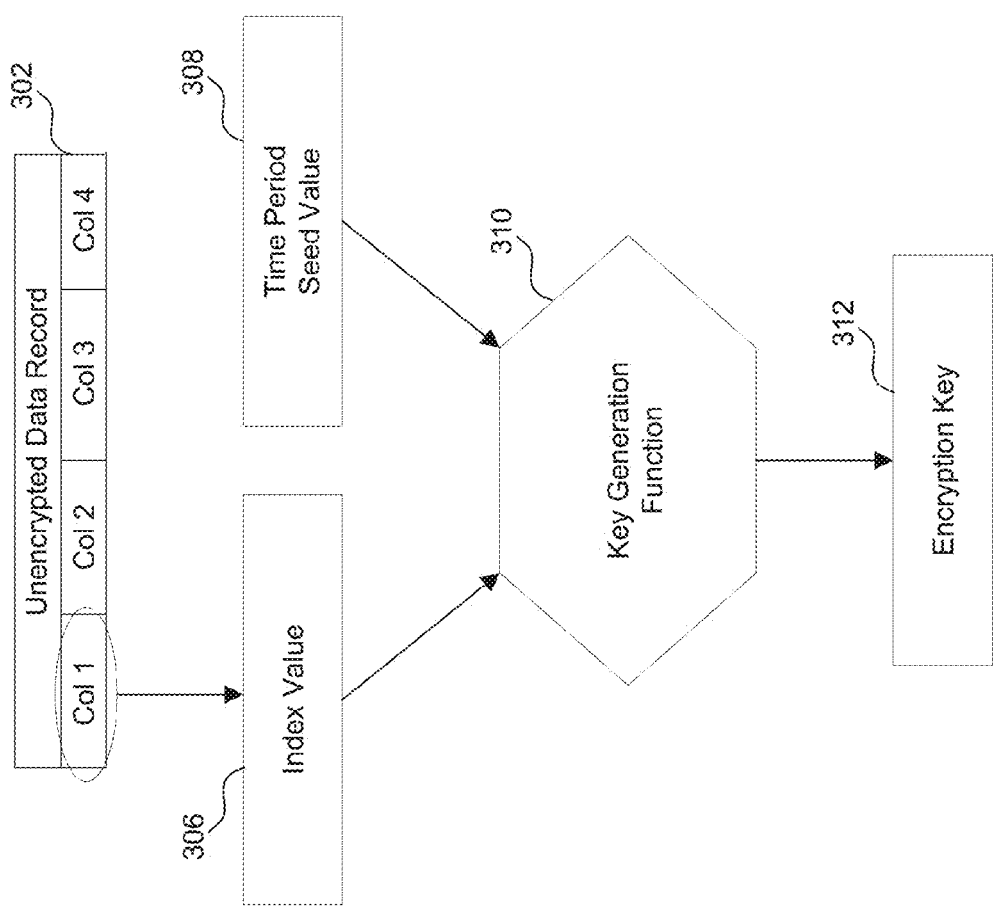
FIG. 3 is a diagram illustrating encryption of an unencrypted data record, according to an embodiment.
Figure 4:
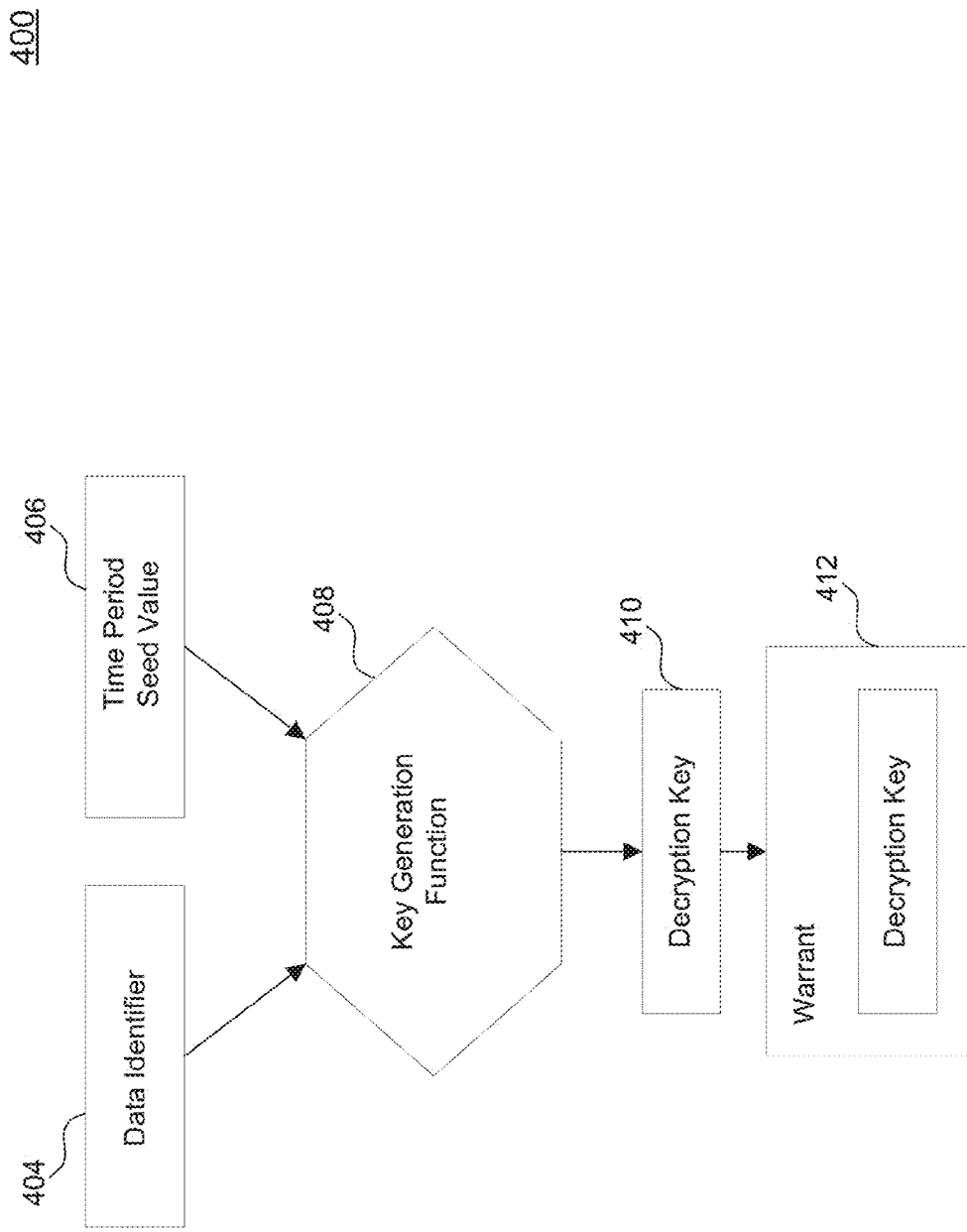
FIG. 4 is a diagram illustrating decryption of a securely stored data record, according to an embodiment.

In an embodiment, once initialization between warrant server 210 and collection server 220 is complete, data storage system 200 can receive and encrypt data, store the encrypted data, and authorize decryption of and access to the stored data. FIG. 3 is a diagram 300 illustrating encryption of an unencrypted data record, according to an embodiment. FIG. 4 is a diagram 400 illustrating decryption of a securely stored data record, according to an embodiment. Embodiments of FIG. 2 are further described with reference to FIGS. 3 and 4.

Collection of Data.

In an embodiment, collection server 220 collects a plurality of data records for secure storage, such as unencrypted data record 302. Unencrypted data record 302 may include multiple data fields, labeled as Col 1, Col 2, Col 3, and Col 4 in FIG. 3. Collection server 220 may identify at least one of these data fields to use as an index value, such as Col 1, as illustrated in FIG. 3. In an embodiment, collection server 220 uses a combination of the identified index value 306 and a time period seed value 308 as parameters to a key generation function 310.

Time period seed value 308 refers to the seed value stored at collection server 220 for the current time period. For example, if the time period is configured to be one day and unencrypted data record is received on the third day, time period seed value 308 would represent the random seed value corresponding to the starting period updated by applying a one-way function, for example, a one-way cryptographic hash function, at the end of the first day and incrementing the time period counter value by 1, and the resulting value updated again by the one-way function at the end of the second day and the time period counter value incremented again by 1. Accordingly, all data records collected during a particular time period are uniquely encrypted based on that time period.

In an embodiment, collection server 220 identifies a portion of unencrypted data record 302 to use as index value 306. Index value 306 may be used as an input to key generation function 310 and represents information that can be used to search for the data record after being stored at data storage server 330. For example, unencrypted data record 302 may represent a phone service call record, including a phone number data field among others. In this case, the phone number data field may be identified as an index value. This enables an encryption key 312 to be generated based on the phone number, and the data record can later be searched for and access to the data record authorized based on the phone number. The portion of unencrypted data record 302 to use as an index value may be identified based on user input or metadata associated with unencrypted data record 302, or may be automatically determined by collection server 220 based on, for example, data field names, types, and values.

In an embodiment, key generation function 310 resides on collection server 220 and encrypts unencrypted data record 302 based on index value 306 and time period seed value 308. These values may be used as parameters to well-known Key Derivation Functions 310 (see e.g. NIST Special Publication 800-108) and the resulting output used as the key in well-known encryption techniques, for example, the Advanced Encryption Standard (AES). Key generation function 310 may generate an encryption key 312, and collection server 220 may encrypt unencrypted data record 302 using encryption key 312. In an embodiment, unencrypted data record 302 is encrypted individually. This provides a level of granularity that enables the data record to be searched for and decrypted separate from other data stored at data storage server 230. Additionally or alternatively, unencrypted data record 302 may be encrypted together with other like or related data records received during the same time period.

In an embodiment, once encrypted, collection server 220 may transmit the time period counter value, the index value, and the encrypted data record (e.g., encrypted data 206) to data storage server 230 for storage. In an embodiment, collection server 220 may also encrypt the index value for unencrypted data record 302 using generated encryption key 312. The time period counter value, encrypted index value, and encrypted data record may be linked and stored as an associated triple at data storage server 230. In an embodiment, the actual time period counter value may not be explicitly stored; instead, a date and/or time corresponding to or falling within a particular time period may be stored in place of the time period counter value. For example, the date of collection of a data record may be stored in place of the time period counter value, and the time period counter value may be determined from this date when needed. In an embodiment, the encrypted index and encrypted data record may additionally or alternatively be stored as an associated pair without the time period counter value. In this case, the time period counter value need not be transmitted from collection server 220 to data storage server 230.

In an embodiment, after collection server 220 finishes encrypting data using encryption key 312, the key may be securely deleted or removed from collection server 220. In an embodiment, encryption keys persist only in volatile memory during use, such as RAM, and the memory may be permanently cleared after use. By not storing encryption keys after use, an attacker who has compromised collection server 220 will not be able to obtain previously used encryption keys. Thus, even if the attacker gains root access to both collection server 220 and data storage server 230, the attacker will not be able to decrypt and access the existing data records stored at data storage server 230.

In an embodiment, multiple index values may be used to encrypt unencrypted data record 302 for increased searching ability and access granularity. In this case, unencrypted data record 302 may be encrypted multiple times for each identified index value. This enables the data record to be searched for using different identifiers, and also enables access to be granted to different subsets of data that each include the data record. In an embodiment, multiple data fields of unencrypted data record 302 may also be used as a single index value. For example, a first name data field and a last name data field may be concatenated and used as a single index value 306.

Accessing Stored Data.

In an embodiment, in order to access data stored at data storage server 230, warrant server 210 must authorize access to the data. Thus, warrant server 210 receives and processes requests for secured data stored at data storage server 230. This configuration prevents a party having access to data storage server 230 from accessing the secured data without external authorization, and requires that warrant server 210 only be in communication with data storage server 230 when authorizing access to the secured data.

In an embodiment, a request to access data includes a data identifier 404 that is used to search for encrypted data stored at data storage server 230. In an embodiment, data identifier 404 includes a plaintext value. Data identifier 404 may correspond to an index value, such as index value 306, that was previously used to encrypt one or more data records by collection server 220. In an embodiment, the request may also include a desired time period to search for records. For example, in the case of phone service call records, a phone company may manage collection server 220 to collect and encrypt user call records using the phone number as an index value. The records may be stored separately at data storage server 230. A user requesting access to his or her call records may submit a request to warrant server 210 including the phone number as data identifier 404 and a desired time range, thus requesting access to data records matching the phone number and occurring during the specified time range. As another example, a user may request access to personal medical records by providing a SSN as data identifier 404 and a desired time range to search.

In an embodiment, the desired time period of the request may include one or more time period counter values corresponding to sought after time periods, or time period counter values may be determined from the desired time period by dividing the difference in time from system initialization to the desired time period by the interval of each time period. For example, the starting time period seed value may have been set on the $10^{th}$ day of the month and the time period set to one day. If records are sought that were encrypted on the $28^{th}$ day of the month, the counter value may be determined to be $(28-10)/1=18$. In an embodiment, the time period counter value may also be determined by examining data records stored in data storage server 230 that match received data identifier 404. That is, data rows having an index value that matches data identifier 404 may be identified, and the associated time period counter value of data row may then be determined. In this case, the index values stored in data storage server 230 may be unencrypted so that the index values can be searched for data identifier 404.

Warrant server 210 may then process the request to determine whether the requester is authorized to access the requested data. If access is authorized, in an embodiment, warrant server 210 generates decryption key 410 by executing key generation function 408. In an embodiment, key generation function 408 resides on warrant server 210 and may be used to recreate decryption keys for data stored at data storage server 230.

In an embodiment, key generation function 408 takes a data identifier 404 and a time period seed value 406 as input to generate the record decryption key. Time period seed value 406 may be recreated by warrant server 210 from the determined time period counter value of the data request described above. As described earlier, warrant server 210 may generate a random seed value during initialization that corresponds to a starting time period. This value may be securely stored by warrant server 210. Warrant server 210 is then able to recreate the seed value for the next time period by applying the same one-way function as collection server 220 to the starting seed value. Accordingly, warrant server 210 may recreate the same time period seed value as used by collection server 220 to encrypt collected data for any particular time period by iteratively applying the one-way function. For example, for a time period of one day, warrant server 210 may recreate the seed value for the third day by applying the one-way function to the starting seed value to first generate a seed value for the second day, and applying again the one-way function to the seed value of the second day to generate a seed value for the third day. To recreate time period seed value 406, the one-way function may be repeatedly applied a number of times corresponding to the determined time period counter value.

In an embodiment, key generation function 408 uses data identifier 404 and time period seed value 406 to generate a decryption key 410. Decryption key 410 may be packaged in a warrant 412 (also illustrated as warrant 208 of FIG. 2) and transmitted to data storage server 230. In some embodiments, warrant 412 may be transferred from warrant server 210 via network 202, by a physical data connection to data storage server 230, or by secure physical media such as an encrypted flash drive. Data storage server 230 may have the tools to decrypt stored data records matching data identifier 404 and time period seed value 406. Thus, by encrypting rows with index value and time period parameters, data records stored at data storage server 230 may be individually searched for and accessed without providing access to an entire set of data.

In an embodiment, the desired time period of a data access request need not correspond directly to time periods used for encryption/decryption of data records. For example, if the starting time period is one day, a request may desire records for an entire month. In this case, key generation function 408 may generate multiple decryption keys, one for each day within the specified month. These decryption keys may be packaged in warrant 412 and transmitted to data storage server 230, which may search for and decrypt data records matching any of the generated decryption keys. Alternatively, a request for data may not include a desired time period or time period counter value. In an embodiment, key generation function 408 may include a default mechanism to address this occurrence. For example, key generation function 408 may generate decryption keys for each elapsed time period that the requester is authorized to access, or key generation function 408 may generate a decryption key only for the current time period.

In an embodiment, upon receiving warrant 412 including decryption key 410, data storage server 230 may search the stored data records to identify data records that match decryption key 410. In an embodiment, data storage server 230 performs this search by attempting to decrypt each stored data record using decryption key 410. Each data record that is successfully decrypted was authorized for access, and the decrypted data records may be provided to the requester. Alternatively, data storage server 230 may perform the search by attempting to decrypt each stored index value using decryption key 410. For each stored index value successfully decrypted, the stored data records associated with the index value can be identified and similarly decrypted. If the number of stored index values is small relative to the number of stored data records, this search method may improve efficiency of data access. In an embodiment, data storage server 230 is configured to monitor the number of stored indices to stored data records to automatically determine which search method to use. In an embodiment, warrant 412 may further include the determined time period counter value of the data request. Data storage server 230 may use this counter value to attempt decryption of rows whose counter value matches the time period counter value in warrant 412. This enables data storage server to perform its search on a subset of rows that match the desired time period counter value.

In an embodiment, in addition to generating decryption key 410, warrant server 210 may encrypt data identifier 404 using decryption key 410. This encrypted data identifier may then be included within warrant 412 and transmitted to data storage server 230. Data storage server 230 may perform its search by looking for data rows with an encrypted index value that matches the encrypted data identifier. Once identified, these rows can then be decrypted using decryption key 410 and returned to the requester. This may improve search efficiency by simply requiring an index lookup to identify matching data records. Other search and decryption methods may also be used without departing from the spirit or scope of described embodiments.

Figure 5A:
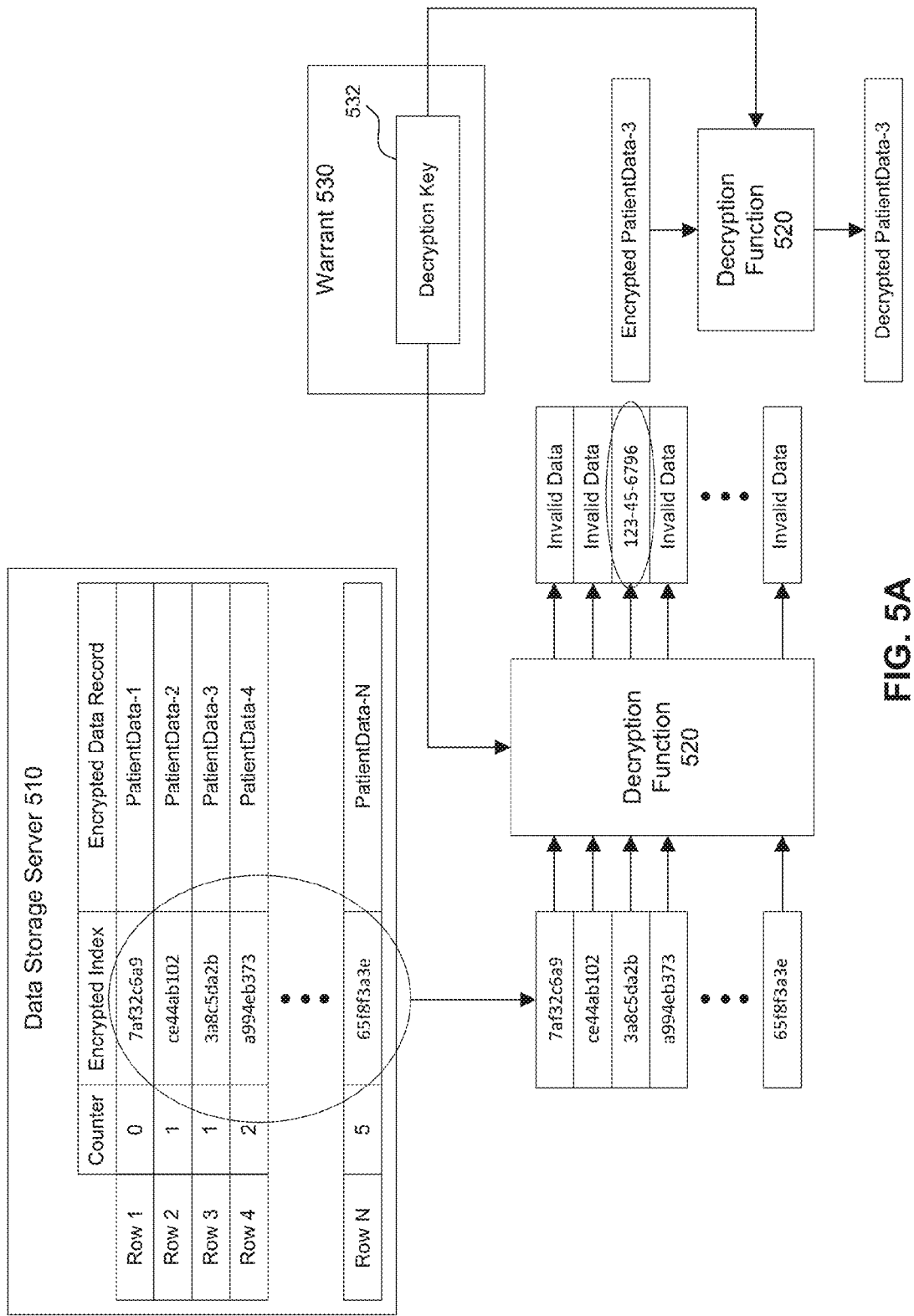
FIG. 5A is a diagram illustrating an example use case for accessing data stored in a data storage server, according to an embodiment.

FIG. 5A is a diagram illustrating an example use case for accessing data stored in a data storage server 510, according to an embodiment. Data storage server 510 may function as described with respect to data storage server 230 of FIG. 2. In an embodiment, data storage server 510 stores data related to patient medical records, although the system described in FIG. 5 may apply to any type of data record. A warrant server, such as warrant server 210 of FIG. 2, and a collection server, such as collection server 220 of FIG. 2, may first be initialized via a one-time pairing, as previously described. The warrant server may be controlled separately from data storage server 510.

The collection server may receive and process entered medical records from various doctors or other medical professionals. The collection server may be provided to doctors or hospitals for this purpose, or the collection server may be managed separately and offered as a third party service to the doctors and hospitals. In the illustrated embodiment, the SSN of a patient is identified as the index value, and the collection server may generate an encryption key using the index value and a seed value for the current time period. Both the index value and the medical record may be encrypted for storage at data storage server 510. Rows 1 through N illustrate example collected rows that have been encrypted by the collection server and transmitted to data storage server 510 for storage. For example, Row 1 stores a patient's encrypted SSN along with the patient's encrypted medical record, denoted as PatientData-1. According to an embodiment, the patient's SSN and medical record are separately encrypted by the collection server for storage. In an embodiment, the time period counter value used to encrypt the data in each row is also stored within the row, as discussed above.

In an embodiment, once medical records are stored at data storage server 510, the data cannot be decrypted and accessed without obtaining proper authorization from the warrant server. In this case, a patient may desire to share his or her medical records with various doctors and other medical professionals. When a doctor requests access to the patient's medical records, the authority managing the warrant server may seek to obtain authorization from the patient. In various embodiments, this authorization may be obtained through interaction with the patient or automatically based on pre-authorization settings arranged by the patient, or by using any other method ensuring the access to the records is authorized.

If access to the patient's medical records is authorized, the warrant server may generate a warrant 530 including a decryption key 532. In an embodiment, if the doctor is authorized to access medical records for multiple time periods, warrant 530 may include a decryption key 532 for each time period, as discussed with respect to FIGS. 2 and 4. Warrant 530 may be transmitted to the doctor, who may query data storage server 510 for the patient's medical records with decryption key 532 for access to authorized data.

In an embodiment, after receiving warrant 530, data storage server 510 may search for data matching decryption key 532. In the embodiment illustrated in FIG. 5, decryption key 532 is identical to its corresponding encryption key used to encrypt data within data storage server 510.

In an embodiment, decryption function 520 uses decryption key 532 to attempt decryption of each encrypted index value stored in Rows 1 through N. For example, the doctor may be authorized to view medical records for the patient with SSN 123-45-6796 encrypted during a particular time period (the time period corresponding to key 532). In this case, only the index value in Row 3, encrypted to ciphertext 3a8c5da2b, is able to be successfully decrypted using decryption key 532. Therefore, Row 3 contains valid data that is authorized to be accessed by warrant 530. The encrypted medical record associated with index value 123-45-6796, PatientData-3, may be decrypted using decryption function 520 and provided to the doctor. In this manner, a patient is able to share his or her medical records for a given time period with various medical professionals in a secure manner that prevents both internal and external access without proper authorization. In an embodiment, if warrant 530 also includes a time period counter value for searching, as discussed with respect to FIG. 4, decryption function 520 may attempt decryption of rows with a matching counter value. For example, if time period 1 is desired and included in warrant 530, decryption function 520 may need to attempt decryption of rows 2 and 3, rather than searching every row.

Figure 5B:
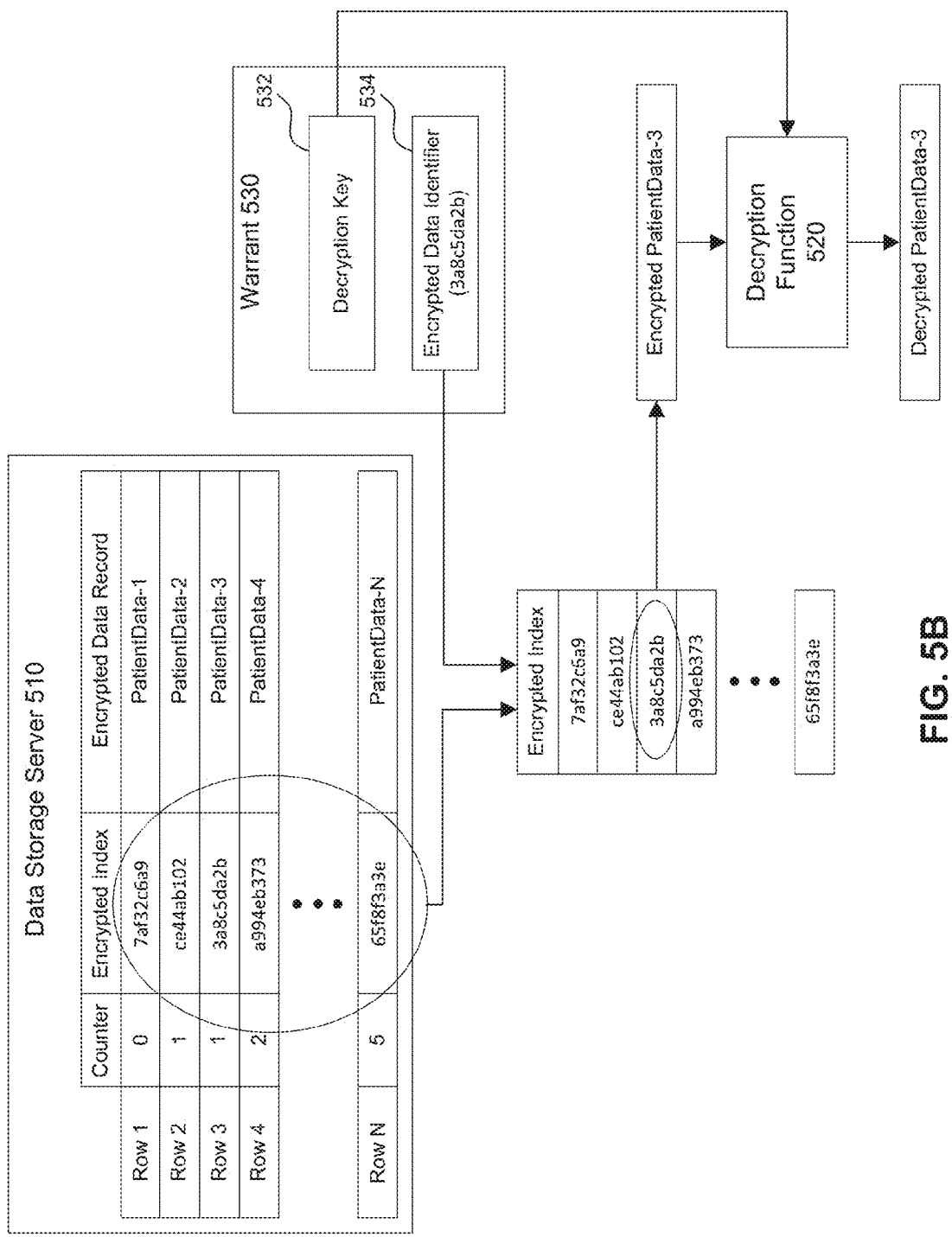
FIG. 5B is a diagram further illustrating an example use case for accessing data stored in a data storage server, according to an embodiment.

FIG. 5B is a diagram further illustrating an example use case for accessing data stored in a data storage server 510, according to an embodiment. FIG. 5B includes the same data storage server 510 and decryption function 520 as described in FIG. 5A. However, in the embodiment illustrated in FIG. 5B, when a doctor, for example, requests access to a patient's medical records, the warrant server generates a warrant 530 including both a decryption key 532 and an encrypted data identifier 534. Encrypted data identifier 534 may be encrypted by the warrant server or the data storage server similar to the encryption of data identifier 404 as discussed with respect to FIG. 4.

Encrypted data identifier 534 enables the records of data storage server 510 to be searched without attempting decryption of each row. Instead, in an embodiment, encrypted data identifier 534 is compared to the encrypted index values in each row of data storage server 510 looking for a match. For example, as in FIG. 5A, the doctor may be authorized to view medical records for the patient with SSN 123-45-6796 for a particular time period. In this case, encrypted data identifier 534 matches the encrypted index in Row 3. Therefore, Row 3 contains the encrypted patient data of the patient with SSN 123-45-6796 that is authorized to be accessed by warrant 530. The encrypted medical record associated with encrypted index value 3a8c5da2b, shown as PatientData-3, may then be decrypted using decryption function 520 and provided to the doctor.

Example Method

Figure 6:
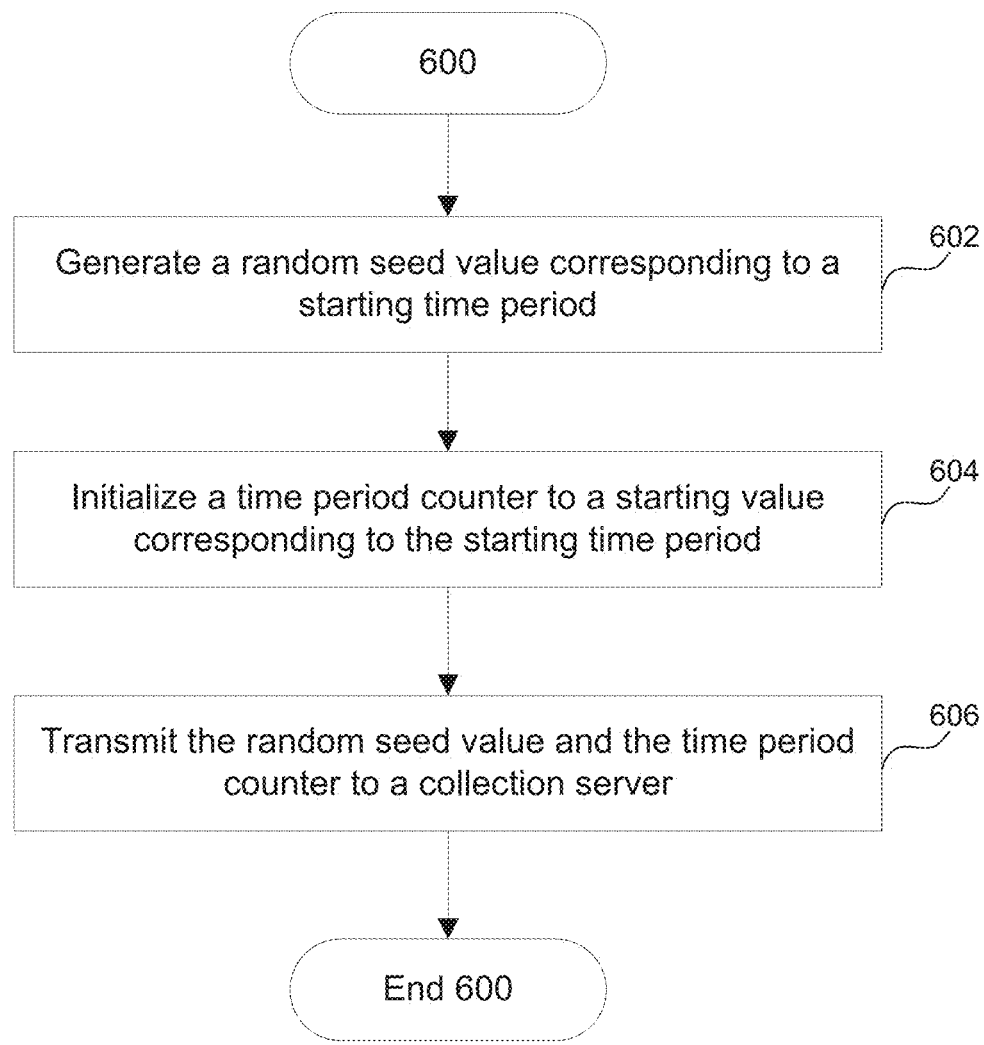
FIG. 6 is an example method for securely storing data records, according to an embodiment.

FIG. 6 is an example method 600 for securely storing data records, according to an embodiment. Method 600 begins at stage 602 by generating a random seed value corresponding to a starting time period. The starting time period may be configured to be any interval of time, such as a minute, an hour, a day, or a month.

At stage 604, a time period counter may be initialized to a starting value corresponding to the starting time period. For example, the time period counter may be initialized to 0, which may then be incremented at the expiration of each time period. At stage 606, the random seed value and the time period counter may be transmitted to a collection server, such as collection server 220 of FIG. 2.

While the warrant server may store the random seed value corresponding to the starting time period, in an embodiment, the collection server updates the random seed value upon expiration of the starting time period and each subsequent time period. Following each update, the current seed value is overwritten and the previous seed value is not stored at the collection server. In an embodiment, the collection server updates the current seed value by applying a one-way function to the seed value. In an embodiment, a well-known cryptographic hash function may be used for this purpose, such as MD6, RIPEMD-320, SHA-256, SHA-512, SHA-3, Whirlpool, BLAKE, or BLAKE2. The use of a one-way function and overwriting previous seed values provides forward secrecy because previous seed values at the collection server cannot be found or recreated. In an embodiment, method 600 is performed by a warrant server, such as warrant server 210 of FIG. 2.

Figure 7:
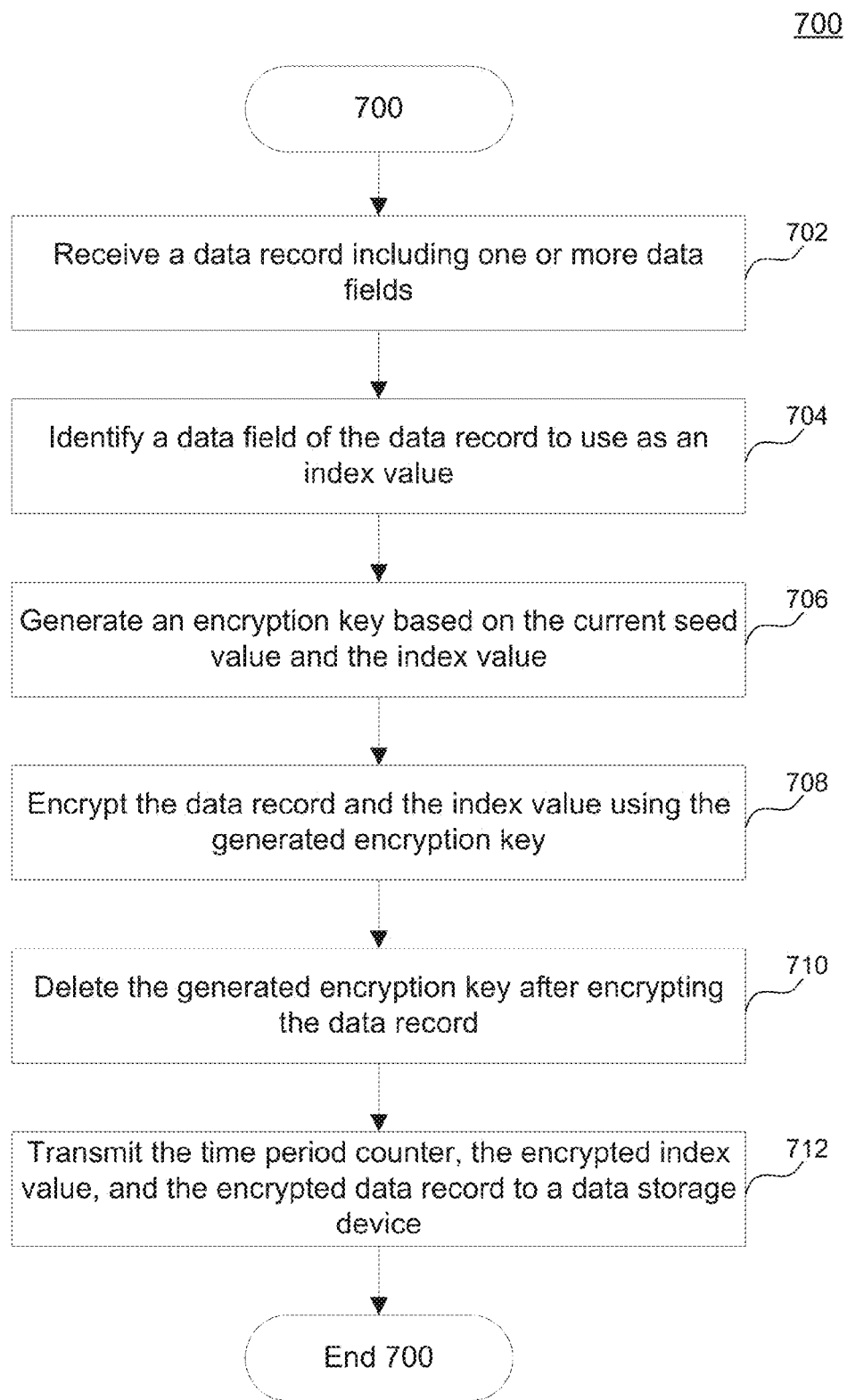
FIG. 7 is an example method for encrypting and storing a received data record, according to an embodiment.

FIG. 7 is an example method 700 for encrypting and storing a received data record, according to an embodiment. Method 700 is discussed with reference to the random seed value and time period counter generated by method 600. Method 700 begins at stage 702 by receiving a data record including one or more data fields, such as unencrypted data record 302 of FIG. 3. By way of example, each data field of unencrypted data record 302 is described as a plaintext data field, but in an embodiment, data fields may contain any unencrypted binary data.

At stage 704, a data field of the data record may be identified to use as an index value. The index value may represent information that can be used to search for the data record after being stored at a data storage server, such as data storage server 330 of FIG. 3. For example, the received data record may represent a phone service call record, including a phone number data field among others. In this case, the phone number data field may be identified as an index value. This enables an encryption key to be generated based on the phone number, and the data record can later be searched for and access to the data record authorized based on the phone number. The data field to use as an index value may be identified based on user input or metadata associated with the received data record, or may be automatically determined by a collection server, such as collection server 220, based on data field names, types, and values.

At stage 706, an encryption key may be generated based on the current seed value and the index value. In an embodiment, the current seed value and the time period counter are maintained as described with respect to FIGS. 2 and 3. These values may be used as parameters to well-known key derivation functions (see e.g. NIST Special Publication 800-108) and the resulting output used as the key in well-known encryption techniques, for example, the Advanced Encryption Standard (AES). The index value also insures that the encryption key used for the data record is unique among data records with that index value and differs from other data records encrypted during the same time interval using the same time period seed value.

At stage 708, the data record and the index value may be encrypted using the generated encryption key. In an embodiment, the received data record is encrypted individually. This provides a level of granularity that enables the data record to be searched for and decrypted separate from other data stored at the data storage server. Additionally or alternatively, the received data record may be encrypted together with other like data records received during the same time period. In this case, the current time period seed value, and not a data record index value, may be included in the key derivation function.

In an embodiment, multiple index values may be used to encrypt the received data record for increased searching ability and access granularity. In this case, the received data record may be encrypted multiple times for each identified index value. This enables the data record to be searched for using different identifiers, and also enables access to be granted for different subsets of data that each includes the data record. In an embodiment, multiple data fields of the received data record may also be used as a single index value. For example, a first name data field and a last name data field may be concatenated and used as a single index value.

At stage 710, the generated encryption key may be securely deleted or removed after encrypting the data record. By not storing encryption keys after use, an attacker who has compromised the collection server will not be able to obtain previously used encryption keys. Thus, even if the attacker gains root access to both the collection server and the data storage server, the attacker will not be able to decrypt and access the existing data records stored at the data storage server.

Finally, at stage 712, the time period counter, the encrypted index value, and the encrypted data record may be transmitted to a data storage server, such as data storage server 230 of FIG. 2. The time period counter, the encrypted index value, and encrypted data record may then be linked and stored as an associated triple at the data storage server for later search and access. In an embodiment, method 700 is performed by a collection server, such as collection server 220 of FIG. 2.

Figure 8:
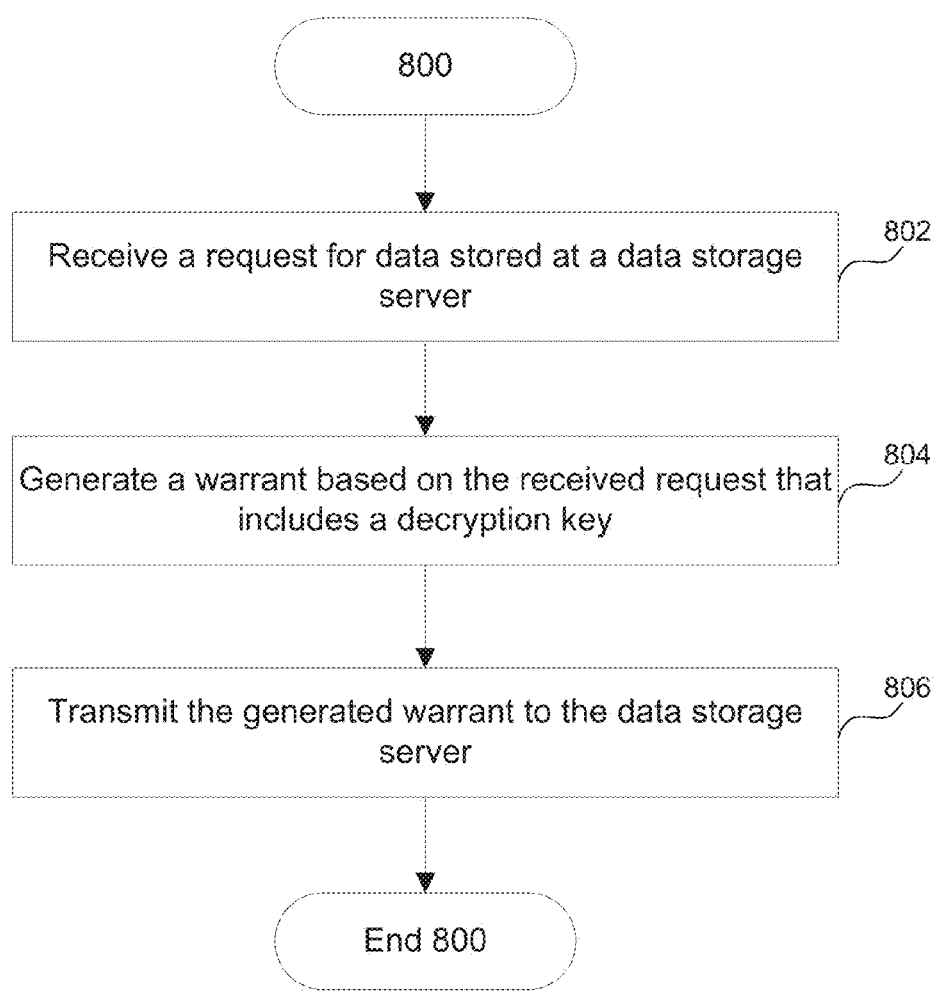
FIG. 8 is an example method for generating a warrant to access securely stored data, according to an embodiment.

FIG. 8 is an example method 800 for generating a warrant to access securely stored data, according to an embodiment. Method 800 begins at stage 802 by receiving a request for data stored at a data storage server, such as data storage server 230 of FIG. 2. In an embodiment, a request to access data includes a data identifier that is used to search for encrypted data stored at a data storage server, such as data storage server 230 of FIG. 2. In an embodiment, the data identifier includes a plaintext value. The data identifier may correspond to an index value that was previously used to encrypt one or more data records. In an embodiment, the request also includes a desired time period to search for records. For example, as described above in the case of phone service call records, a phone company may collect and encrypt user call records using the phone number as an index value. The records may be stored separately at the data storage server. A user requesting access to his or her call records may submit a request including the phone number as a data identifier and a desired time range, thus requesting access to data records matching the phone number and occurring during the specified time range. As another example, a user may request access to personal medical records by providing a SSN as a data identifier and a desired time range to search.

At stage 804, upon administrative approval of the request for data access by appropriate warrant authorities (which is beyond the scope of this disclosure), the warrant server may be activated and a warrant may be generated based on the received request that includes a decryption key. In an embodiment, the decryption key provides access to data authorized by the warrant.

In an embodiment, the decryption key is generated by a key generation function, such as key generation function 408 of FIG. 4. The key generation function takes a data identifier and a time period seed value as parameters. To execute the key generation function, the desired time period of the data request may be used to determine a time period counter value corresponding to the desired time period, which may then be used to derive the time period seed value, as discussed with respect to FIGS. 2 and 4.

As described with respect to method 600 of FIG. 6, an initial random seed value may initially be generated corresponding to a starting time period. The seed value for the next time period may be recreated at stage 804 by applying the same one-way function used during encryption of data records to the initial seed value. Accordingly, the seed value for the desired time period may be recreated for any particular time period by repeatedly applying the one-way function. For example, for a time period of one day and desired time period corresponding to the third day (e.g., the time period counter=2), the seed value for the third day may be recreated by applying the one-way function to the starting seed value to first generate a seed value for the second day, and applying again the one-way function to the seed value of the second day to generate a seed value for the third day. The key generation function may then use the index value and the determined seed value to generate the decryption key.

In an embodiment, the desired time period of the data access request need not correspond directly to time periods used for encryption/decryption of data records. For example, if the starting time period is one day, a request may desire records for an entire month. In this case, multiple decryption keys may be generated at stage 804, one for each day within the specified month. These decryption keys may then be packaged in the warrant and transmitted to the data storage server. Alternatively, the data access request may not include a desired time period. In various embodiments, this occurrence may be addressed by generating decryption keys for each elapsed time period that the requester is authorized to access, generating a decryption key only for the current time period.

At stage 806, the generated warrant and decryption key may be transmitted to the data storage server. In various embodiments, the warrant may be transferred via a network, such as network 202 of FIG. 2, by a physical data connection to the data storage server, or by secure physical media such as an encrypted flash drive. In an embodiment, method 800 is performed by a warrant server, such as warrant server 210 of FIG. 2.

Figure 9:
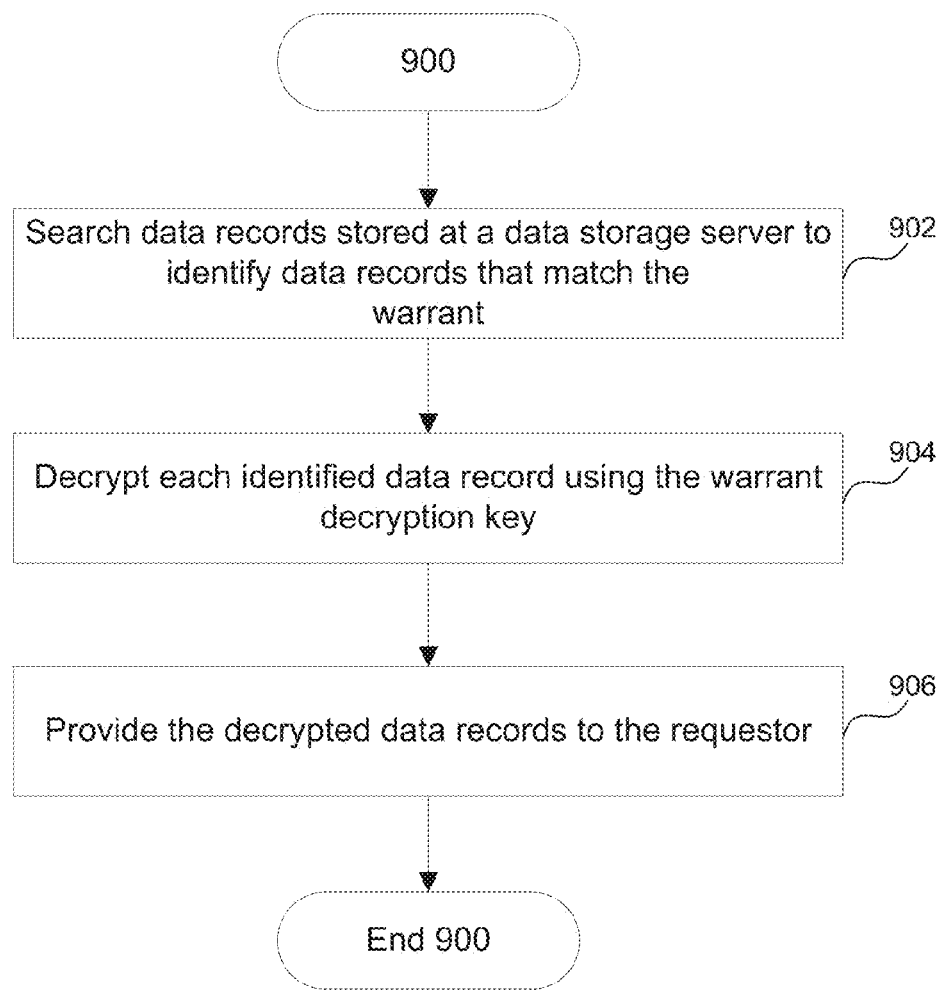
FIG. 9 is an example method for accessing securely stored data using a warrant, according to an embodiment.

FIG. 9 is an example method 900 for accessing securely stored data using a warrant, according to an embodiment. Method 900 is discussed with reference to the warrant and included decryption key generated by method 800. Method 900 begins at stage 902 by searching data records stored at a data storage server, such as data storage server 230 of FIG. 2, to identify data records that match the warrant. In an embodiment, this search is performed by attempting to decrypt each stored data record using the warrant decryption key. Each data record that is successfully decrypted may be determined to be authorized for access. Alternatively, the warrant may include an encrypted data identifier, and the search may be performed by searching the encrypted data for records with an encrypted index value matching the encrypted data identifier, as discussed above with respect to FIGS. 4 and 5B. For each stored index value successfully matched, the stored data records associated with the index value have been identified and can be decrypted. If the number of stored index values is small relative to the number of stored data records, this search method may improve efficiency of data access. In an embodiment, the number of stored indices to stored data records may be monitored to automatically determine which search method to use.

At stage 904, each identified data record may be decrypted using the warrant decryption key, and at stage 906, the decrypted data records may be provided to the requester. In an embodiment, method 900 is performed by the data storage server.

Example Computer System

Figure 10:
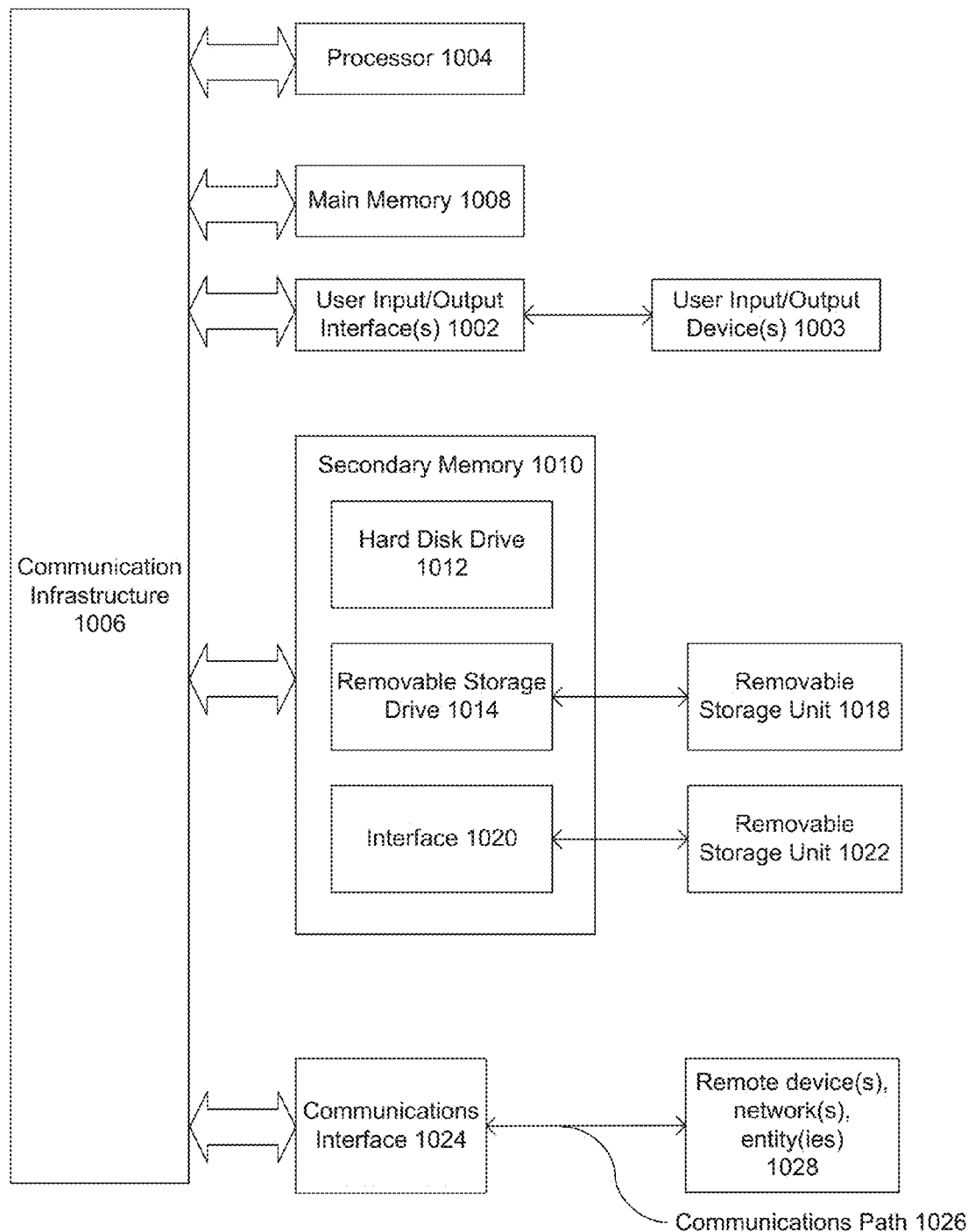
FIG. 10 is a diagram illustrating an example computing device, according to an embodiment.

FIG. 10 is an example computing system useful for implementing various embodiments. Various embodiments can be implemented, for example, using one or more well-known computer systems, such as computer system 1000. Computer system 1000 can be any well-known computer capable of performing the functions described herein, such as computers available from International Business Machines, Apple, Sun, HP, Dell, Sony, Toshiba, etc.

Computer system 1000 includes one or more processors (also called central processing units, or CPUs), such as a processor 1004. In an embodiment, processor 1004 may include security hardened enclaves that provide additional protection for cryptographic processes and applications. Processor 1004 may also be a cryptographic co-processor such as an Application Specific Integrated Circuit (ASIC), Hardware Security Module (HSM), or Trusted Platform Module (TPM) designed specifically for performing cryptographic operations as described with respect to FIGS. 1-9 above and that provide security hardened hardware protections. Processor 1004 may be connected to a communication infrastructure or bus 1006.

One or more processors 1004 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1000 also includes user input/output device(s) 1003, such as monitors, keyboards, pointing devices, etc., which communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/or any other computer data storage device. Removable storage drive 1014 reads from and/or writes to removable storage unit 1018 in a well-known manner.

According to an exemplary embodiment, secondary memory 1010 may include other means, instrumentalities, or other approaches for allowing computer programs and/or other instructions and/or data to be accessed by computer system 1000. Such means, instrumentalities, or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, a cryptographic co-processor 1004, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use the inventions using data processing devices, computer systems and/or computer architectures other than that shown in FIG. 10. In particular, embodiments may operate with software, hardware, and/or operating system implementations other than those described herein.

Embodiments of the present inventions have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the inventions that others can, by applying knowledge within the skill of the art, readily modify and/or adapt for various applications such specific embodiments, without undue experimentation, without departing from the general concept of the present inventions. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present inventions should not be limited by any of the above-described embodiments, but should be defined only in accordance with the following claims and their equivalents.

What is claimed is:

1. A data storage system for securely storing data records, comprising:
   one or more computing devices;
   a warrant server, implemented on a first of the one or more computing devices, configured to:
   generate an initial random seed value corresponding to a first time period; and
   initialize a time period counter to a starting value corresponding to the first time period;
   a collection server, implemented on a second of the one or more computing devices, configured to:
   receive a data record comprising one or more data fields;
   receive the random seed value and the time period counter from the warrant server;
   identify a data field of the data record to use as an index value;
   generate an encryption key based on the received random seed value and the index value;
   encrypt the data record using the generated encryption key; and remove permanently the generated encryption key after encrypting the data record; and a data storage server, implemented on a third of the one or more computing devices, configured to:

store, as an associated triple, the time period counter, the index value, and the encrypted data record.

2. The data storage system of claim 1, wherein the collection server is further configured to encrypt the index value using the generated encryption key.

3. The data storage system of claim 1, wherein the collection server is further configured to:

update the received random seed value by applying a one-way function to the received random seed value upon expiration of the first time period;

increment the received time period counter;

generate the encryption key based on the updated random seed value and the index value; and repeat the updating and incrementing upon expiration of each subsequent time period.

4. The data storage system of claim 1, wherein the warrant server is further configured to:

receive a request for data stored at the data storage server, the request including a data identifier;

generate a warrant based on the received request, the warrant including a decryption key derived based on the initial random seed value and the data identifier; and transmit the generated warrant to the data storage server.

5. The data storage system of claim 4, wherein the warrant server is further configured to:

derive a new seed value for each elapsed time period since the first time period by iteratively applying a one-way function to the initial random seed value;

generate an additional decryption key for each elapsed time period based on the new seed value and the data identifier; and transmit each additional generated decryption key to the data storage server with the warrant.

6. The data storage system of claim 4, wherein the request further includes a requested time period, and wherein the warrant server is further configured to:

determine a time period counter value corresponding to the requested time period;

derive a new seed value for the determined time period counter value by applying a one-way function to the initial random seed value; and generate the warrant decryption key based on the new seed value and the data identifier.

7. The data storage system of claim 4, wherein the data storage server is further configured to:

search the stored data records to identify data records that match the warrant;

decrypt each identified data record using the warrant decryption key; and provide the decrypted data records to a requester.

8. The data storage system of claim 7, wherein to search the stored data records, the data storage server is further configured to attempt decryption of each stored data record using the warrant decryption key.

9. The data storage system of claim 7, wherein the collection server is further configured to encrypt the identified index value, and wherein to search the stored data records, the data storage server is further configured to:

attempt decryption of each stored index value using the warrant decryption key; and for each stored index value successfully decrypted, identify the stored data records associated with the stored index value.

10. The data storage system of claim 7, wherein the warrant server is further configured to:

transmit the data identifier with the generated warrant to the data storage server; and wherein to search the stored data records, the data storage server is further configured to:

identify each stored index value that matches the data identifier; and for each identified stored index value, identify the stored data records associated with the stored index value.

11. The data storage system of claim 10, wherein the collection server is further configured to encrypt the identified index value, and wherein the warrant server is further configured to encrypt the data identifier using the warrant decryption key.

12. The data storage system of claim 1, wherein the warrant server is taken off-line once the collection server receives the random seed value and the time period counter.

13. The data storage system of claim 1, wherein the warrant server is permanently off-line, and wherein communication from the warrant server to the collection server and the data storage server is accomplished via hand-carried physical storage media.

14. The data storage system of claim 1, wherein the second computing device and the third computing device are the same computing device.

15. A method for securely storing data records, comprising:

receiving, from a warrant server, an initial random seed value corresponding to a first time period and a time period counter corresponding to the first time period;

receiving a data record comprising one or more data fields;

identifying a data field of the data record to use as an index value;

generating an encryption key based on the received random seed value and the index value;

encrypting the data record using the generated encryption key;

removing permanently the generated encryption key after encrypting the data record; and storing, as an associated triple, the time period counter, the index value, and the encrypted data record at a data storage server, wherein the warrant server and the data storage server are implemented on separate devices.

16. The method of claim 15, further comprising encrypting the identified index value using the generated encryption key.

17. The method of claim 15, further comprising:

updating the received random seed value by applying a one-way function to the received random seed value upon expiration of the first time period;

incrementing the received time period counter;

generating the encryption key based on the updated random seed value and the index value; and repeating the updating and incrementing upon expiration of each subsequent time period.

18. The method of claim 15, further comprising:

receiving a request for data stored at the data storage server, the request including a data identifier and a requested time period;

determining a time period counter value based on the requested time period; and receiving a warrant based on the received request, the warrant including a decryption key derived based on the determined time period counter value, the initial random seed value, and the data identifier.

19. The method of claim 18, further comprising:
searching the stored data records to identify data records that match the warrant;
decrypting each identified data record using the warrant decryption key; and
providing the decrypted data records to a requester.

20. The method of claim 19, wherein the searching further comprises attempting decryption of each stored data record using the warrant decryption key.

21. The method of claim 19, further comprising encrypting the identified index value, wherein the searching further comprises:
attempting decryption of each stored index value using the warrant decryption key; and
for each stored index value successfully decrypted, identifying the stored data records associated with the stored index value.

22. The method of claim 19, further comprising:
receiving an encrypted version of the data identifier with the received warrant;
identifying each stored encrypted index value that matches the encrypted data identifier; and
for each identified stored index value, identifying the stored data records associated with the stored index value.

23. The method of claim 22, further comprising encrypting each stored index value, wherein the received data identifier is an encrypted version of the data identifier.

24. The method of claim 15, further comprising taking the warrant server off-line once the random seed value and the time period counter are received.

25. A non-transitory computer-readable storage device having instructions stored thereon that, when executed by at least one computing device, causes the at least one computing device to perform operations comprising:
receiving, from a warrant server, an initial random seed value corresponding to a first time period and a time period counter corresponding to the first time period;
receiving a data record comprising one or more data fields;
identifying a data field of the data record to use as an index value;
generating an encryption key based on the received random seed value and the index value;
encrypting the data record using the generated encryption key;
removing permanently the generated encryption key after encrypting the data record; and
storing, as an associated triple, the time period counter, the index value, and the encrypted data record at a data storage server,
wherein the warrant server and the data storage server are implemented as separate servers.

26. The non-transitory computer-readable storage device of claim 25, the operations further comprising encrypting the identified index value using the generated encryption key.

27. The non-transitory computer-readable storage device of claim 25, the operations further comprising:
updating the received random seed value by applying a one-way function to the received random seed value upon expiration of the first time period;
incrementing the received time period counter;
generating the encryption key based on the updated random seed value and the index value; and
repeating the updating and incrementing upon expiration of each subsequent time period.

28. The non-transitory computer-readable storage device of claim 25, the operations further comprising:
receiving a request for data stored at the data storage server, the request including a data identifier and a requested time period;
determining a time period counter value based on the requested time period; and
receiving a warrant based on the received request, the warrant including a decryption key derived based on the determined time period counter value, the initial random seed value, and the data identifier.

29. The non-transitory computer-readable storage device of claim 28, the operations further comprising:
searching the stored data records to identify data records that match the warrant;
decrypting each identified data record using the warrant decryption key; and
providing the decrypted data records to a requester.

30. The non-transitory computer-readable storage device of claim 25, the operations further comprising taking the warrant server off-line once the random seed value and the time period counter are received.

* * * * *